L. E. WEBSTER.
REENFORCEMENT FOR SHOVEL HANDLES.
APPLICATION FILED AUG. 6, 1920.
1,410,043.
Patented Mar. 21, 1922.
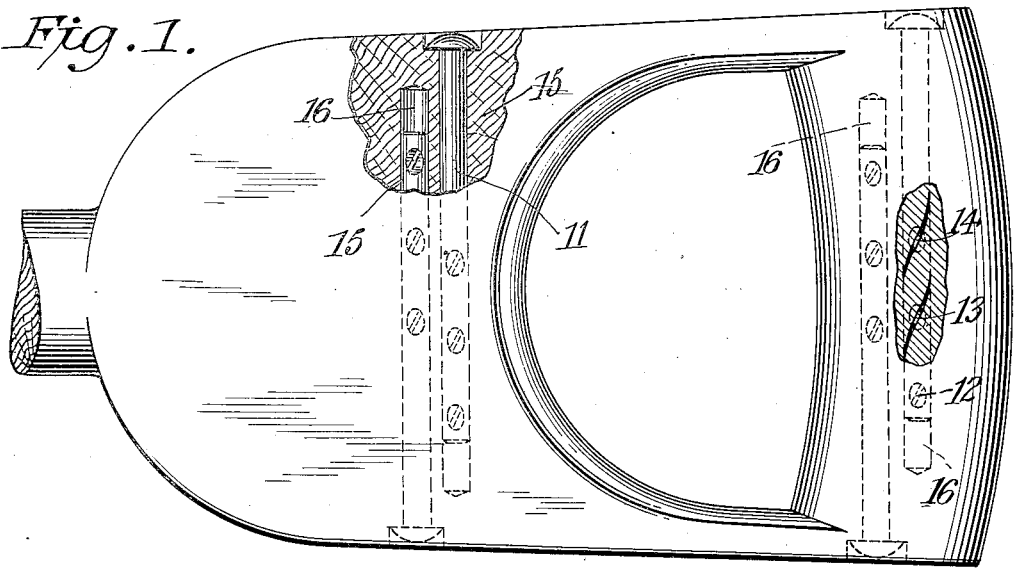
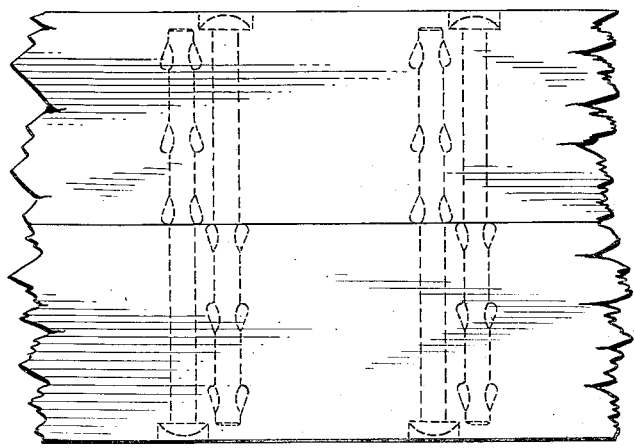
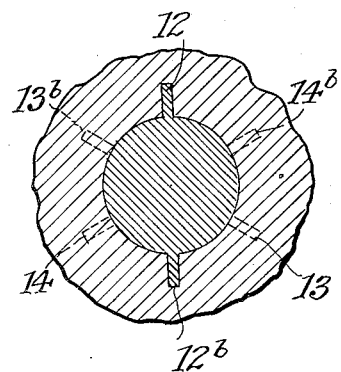
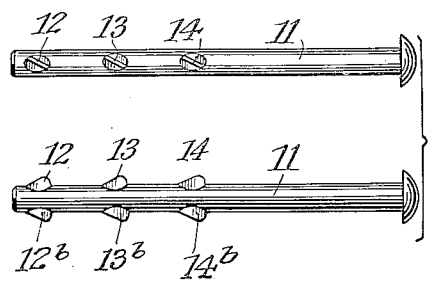
INVENTOR
Lewis E. Webster
BY
Kerr Page Cooper & Hayward
ATTORNEYS

UNITED STATES PATENT OFFICE.

LEWIS E. WEBSTER, OF WYOMING, PENNSYLVANIA.

REENFORCEMENT FOR SHOVEL HANDLES.

1,410,043.  Specification of Letters Patent.  Patented Mar. 21, 1922.

Application filed August 6, 1920. Serial No. 401,795.

*To all whom it may concern:*

Be it known that I, LEWIS E. WEBSTER, a citizen of the United States of America, residing at Wyoming, in the county of Luzerne and State of Pennsylvania, have invented certain new and useful Improvements in Reenforcements for Shovel Handles, of which the following is a full, clear, and exact description.

In the manufacture of shovels and like tools where the so-called D handles are employed it has been found desirable to insert reenforcing screws in the grip portion of the D handle. The purpose of these screws has been to reenforce and strengthen the D handle, allow for an adjustment and take up, should shrinkage or a split occur. The screws or bolts heretofore used for this purpose have not been found entirely satisfactory as they tend to back out of place and it has been found difficult to properly place the same in the handle grip.

The present invention has for its objects the provision of a slotless screw device of novel form which is particularly adapted for the reenforcing of shovel and other tool handles.

A further object of the invention resides in the provision of a slotless screw which is adapted for uniting planks or blocks together in such a manner that a stronger joint may be secured between the planks or blocks than with the fastenings heretofore used.

Other objects and advantages reside in the provision of a screw which is cheap and economical to manufacture.

Other objects and advantages will be further pointed out in the accompanying specification and shown on the drawings in which:

Fig. 1 is a view of a shovel handle reenforced with my novel slotless screw.

Fig. 2 is a diagrammatic view which shows the manner in which the slotless screws rotate as they enter the wood and illustrates the manner in which one screw portion closes the slot in the wood forced by the preceding screw portion.

Fig. 3 shows a pair of planks joined together with my novel fastening means.

Fig. 4 shows detail top and side views of the slotless screws.

Referring to Fig. 4, the screws comprise a cylindrical stem 11, here shown as rounded. Upset from the metal of the cylindrical stem are swedged screw-threaded portions 12, 13 and 14 and a second group of threaded portions marked $12^b$, $13^b$ and $14^b$. The angle of lead of each threaded portion is such that the spirals do not align with each other. In the present embodiment I have found it preferable to displace the spirals of threaded portions 12, 13 and 14, 120° from each other. Threaded portions $12^a$, $13^b$ and $14^b$ are so arranged that the developed spirals are likewise displaced 120° relatively to each other and are also displaced 180° relatively to the corresponding spirals of threaded portions 12, 13 and 14. This relative displacement of the displaced spirals produces certain desirable results to be hereafter set forth.

In applying the slotless screws to reenforce a shovel handle I drill in from the sides of the grip and flat portions of the handle parallel holes 15 of such diameter as to snugly receive the shank portions of the slotless screws. The holes do not extend entirely through and have a length in excess of the length of the slotless screws as shown at 16 in Fig. 1. Preferably the ends of the holes are countersunk to provide a recess for the heads of the screws.

After drilling the slotless screws are inserted from opposite sides and driven into place by a hammer, arbor press or other tool. The driving action causes the threaded portions to enter the wood and thereafter a spiral rotation is imparted to the screw as the same is advanced. The various individual and separated thread portions all enter the wood at different places and the effect of this entry is to close up the spiral slot in the wood made by the preceding threaded portion so that finally the slotless screws are in effect molded in the wood. Furthermore, each threaded portion enters solid wood not heretofore displaced and the result is that the slotless screws are firmly secured in place in the handle and do not tend to back out. The closure of the spiral paths in the wood behind the threaded portions also occurs when the wood shrinks and this shrinkage supplements the tightening action and prevents the loosening of the screws.

Should the handle shrink enough to allow the slotless screws to protrude, the latter may be hammered in further by reason of the extended drill opening 16, and they will thereafter be securely held in position, Also if the handle should accidentally be split, the split portion can be drawn together by driving in the slotless screws. The screws overlapping by a considerable portion of their length form a strong and rigid reenforcement for the weakest parts of the D handle.

If it is desired to use the slotless screws for securing planks together they are applied in a similar manner as shown in Fig. 3. After the screws have been once driven home it will be found that their withdrawal is quite difficult inasmuch as the threaded portions would have to revolve backward through the same channels which they cut while entering. The fastening thus secured is stronger than the ordinary spike fastening used with planking.

What I claim as my invention is:

1. A screw comprising in combination, a shank, and a plurality of thread-forming helical projections upon said shank, the helical surfaces of certain of said projections being axially displaced with respect to the helical surfaces of the other projections.

2. A slotless screw comprising a shank portion and a plurality of independent thread portions disposed upon independent developed spiral surfaces, whereby the said thread portions successively enter the wood at different points when the screw is driven into position.

3. A slotless screw comprising a shank portion and a plurality of upset swaged portions, said thread portions being disposed one behind the other from the end of the screw and being adapted to enter the wood at different points and follow independent spiral paths when the same are driven into position.

4. A slotless screw comprising a shank having upset therefrom a plurality of groups of thread portions, the said thread portions of each group having a lead of such amount that the threads enter the wood at different angular points.

In testimony whereof I hereto affix my signature.

LEWIS E. WEBSTER.